United States Patent
Gupta et al.

(10) Patent No.: US 8,181,069 B2
(45) Date of Patent: May 15, 2012

(54) METHOD AND SYSTEM FOR PROBLEM DETERMINATION USING PROBE COLLECTIONS AND PROBLEM CLASSIFICATION FOR THE TECHNICAL SUPPORT SERVICES

(75) Inventors: Manish Gupta, New Delhi (IN); Anca Sailer, Hawthorne, NY (US); Manish Sethi, New Delhi (IN); Hidayatullah H. Shaikh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/555,337

(22) Filed: Sep. 8, 2009

(65) Prior Publication Data

US 2011/0060946 A1    Mar. 10, 2011

(51) Int. Cl.
*G06F 11/00* (2006.01)

(52) U.S. Cl. ............ 714/45; 714/26; 714/39; 714/46; 714/47.1; 714/57

(58) Field of Classification Search .......... 714/26, 714/32, 33, 39, 45, 46, 47.1, 57
See application file for complete search history.

(56) References Cited

U.S. PATENT DOCUMENTS

| | | | |
|---|---|---|---|
| 5,367,667 A * | 11/1994 | Wahlquist et al. | 714/32 |
| 5,682,523 A | 10/1997 | Chen et al. | |
| 5,897,630 A | 4/1999 | Schneider et al. | |
| 6,012,152 A * | 1/2000 | Douik et al. | 714/26 |
| 6,532,552 B1 | 3/2003 | Benignus et al. | |
| 6,636,981 B1 | 10/2003 | Barnett et al. | |
| 6,671,723 B2 | 12/2003 | Nguyen et al. | |
| 6,725,405 B2 | 4/2004 | Batten et al. | |
| 6,804,714 B1 | 10/2004 | Tummalapalli | |
| 7,039,644 B2 | 5/2006 | Hind et al. | |
| 7,096,459 B2 | 8/2006 | Keller et al. | |
| 7,167,998 B2 | 1/2007 | Brodie et al. | |
| 7,184,935 B1 | 2/2007 | Cohen et al. | |
| 7,203,881 B1 * | 4/2007 | Williams et al. | 714/741 |
| 7,340,649 B2 * | 3/2008 | Angamuthu et al. | 714/27 |
| 7,379,846 B1 * | 5/2008 | Williams et al. | 702/185 |
| 7,681,180 B2 * | 3/2010 | de Halleux et al. | 717/124 |
| 7,949,901 B2 * | 5/2011 | Yano et al. | 714/33 |
| 8,001,423 B2 * | 8/2011 | Spier et al. | 714/26 |
| 8,072,901 B1 * | 12/2011 | Blair et al. | 370/254 |
| 2008/0133978 A1 * | 6/2008 | Angamuthu et al. | 714/39 |
| 2009/0019310 A1 * | 1/2009 | Nastacio et al. | 714/26 |
| 2010/0083145 A1 * | 4/2010 | Schang et al. | 715/760 |

(Continued)

OTHER PUBLICATIONS

IBM NetSol, http://www-07.ibm.com/in/netsol/products_services.html.

(Continued)

*Primary Examiner* — Robert Beausoliel, Jr.
*Assistant Examiner* — Joshua P Lottich
(74) *Attorney, Agent, or Firm* — Scully, Scott, Murphy & Presser, P.C.; Louis J. Percello, Esq.

(57) ABSTRACT

A system and method for problem determination using probe collections and problem classification for the technical support services monitor and collect data associated with a computer system, raise an alarm based on the monitored and collected data, probe the computer system for additional information, filter the monitored and collected data based on the additional information established from probing, and use the filtered data to label a problem associated with the raised alarm.

20 Claims, 5 Drawing Sheets

U.S. PATENT DOCUMENTS

2010/0138703 A1* 6/2010 Bansal et al. .................. 714/57
2010/0318853 A1* 12/2010 Beg et al. ........................ 714/37
2010/0318855 A1* 12/2010 Beg et al. ........................ 714/39
2011/0197094 A1* 8/2011 Wagner ............................ 714/20

OTHER PUBLICATIONS

ITM, IBM Tivoli Monitoring http://www.ibm.com/software/tivoli/products/monitor.
IBM Director, http://www-03.ibm.com/systems/management/director/.
ISA, IBM Support Assistant, http://www-01.ibm.com/software/support/isa/.
The ActiveBPEL Community Edition Engine, http://www.activevos.com/community-open-source.php.
Websphere Process Server, http://www-01.ibm.com/software/integration/wps/.
Tivoli Application Dependency Discovery Manager, http://www-01.ibm.com/software/tivoli/products/taddm/.

* cited by examiner

METHOD AND SYSTEM FOR PROBLEM DETERMINATION USING PROBE COLLECTIONS AND PROBLEM CLASSIFICATION FOR THE TECHNICAL SUPPORT SERVICES

BACKGROUND

The present disclosure relates generally to computer systems and service technologies, and more particularly to problem determination using probe collections and problem classification for the technical support services.

An effective problem determination and resolution (PDR) process can contribute to a substantial reduction in technical support services costs. PDR is the process of detecting anomalies in a monitored system, locating the problems responsible for the issue, determining the root cause and fixing the cause of the problem. Thus, once the user (customer or technical personnel) detects a problem, he first tries to identify the type of problem in order to search for the relevant fix. Especially in case of software problems in multi-tier information technology (IT) environment with complex system dependencies, the user may experience a front-end issue caused by a back-end problem. Thus, the problem may be only the effect of an underlying issue within the IT environment and, on one hand, the fixes found may not address the root cause, while on the other hand, the root cause may be buried in large amounts of logs, traces, and monitoring data from healthy resources involved in the propagated failure. Analyzing all the available logs and monitoring data is time consuming and error prone, therefore the PDR process would benefit from filtering the data related to the failing resource.

An example of a multi-tier environment is an e-business system which is supported by an infrastructure including for example the following subsystems connected by local and wide area networks: web based presentation services, access services, application business logic, messaging services, database services and storage subsystems. The existing solutions that provide problem determination are limited in that they are problem specific and as such lack the potential of being applied to wider type of issues. Other known methodologies use only one type of the available information, overlooking or ignoring information that may be relevant to the problem at hand. Yet other known methods provide particular approaches to the PDR technology that is applicable in specific scenarios only.

BRIEF SUMMARY

A method and system for problem determination using probe collections and problem classification for the technical support services are provided. The method, in one aspect, may include monitoring and collecting, by a processor, data associated with a running computer system and raising an alarm, automatically by the processor, based on the monitored and collected data. The method may further include probing the computer system for additional information associated with the alarm; and filtering the monitored and collected data based on the additional information established from probing. The method may also include using the filtered data to label a problem associated with the raised alarm.

A system for problem determination using probe collections and problem classification for the technical support services, in one aspect, may include a monitoring and data collection processing module operable to monitor and collect data associated with a computer system, the monitoring and data collection module further operable to raise an alarm based on the monitored and collected data. The system may also include a probe platform operable to probe the computer system for additional information, the probe platform further operable to filter the monitored and collected data based on the additional information established from probing. The system may further include a classifier module operable to use the filtered data and automatically label a problem associated with the raised alarm.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

In one embodiment, the system and method of the present disclosure effectively localize IT problems by appropriately probing the failing environment and categorizing the IT resources in view of filtering the available data such as, but not limited to, performance data, resources consumption data, logs data, for more focused or targeted problem determination.

The system and method of the present disclosure may include processes and algorithms to:

Probe the failing environment thus localizing the problem and filtering out the logs and monitoring data relevant to the failing resource from the data generated by resources under failure propagation;

Label the problem (e.g., the problem ticket) and the related log and monitoring data with the real underlying problem that occurred when the data was collected;

Learn from historical labeled data the patterns specific to the existing problem taxonomy;

Recognize problems when given a new set of log and monitoring data based on the patterns learned at c).

Enrich the probing repository with adding executable probing algorithms and/or plans by the community to share the experience across customer environment and problem resolutions.

The system and method of the present disclosure may 1) enhance the problem determination efficiency by combing appropriately different problem determination technologies instead of focusing on a particular one; and, 2) enable the user to identify the root cause so that the fix is searched based on the cause rather than on its propagated effects. This may result in operational cost savings. A more focused, filtered set of data increases the accuracy of the problem identification. If the problem results in a service request submission to the technical support, the problem routing can benefit from this initial problem classification instead of symptom based routing. This reduces the risk of re-routing the request when the symptom is a remote effect of a cause located in a completely different resource.

In one embodiment, we build a framework that brings the principles of Service Oriented Architecture (SOA) and information integration to automate problem determination activities. The framework may reduce the time to localize a problem. Following SOA principles, various reusable activities are modeled as services that are further composed to offer higher level services. Examples of such services may include:

Probe execution services (e.g., a script execution service whose inputs are a script, the values of associated parameters and the execution environment);

Output analysis services (e.g., a service that parses the text output of a probe execution service and creates output in the form of structured data, given mapping rules, possibly based on regular expressions);

Information integration services (e.g., a service that provides values to variables given the mapping from query to information stores such as CMDB).

Figure 1:
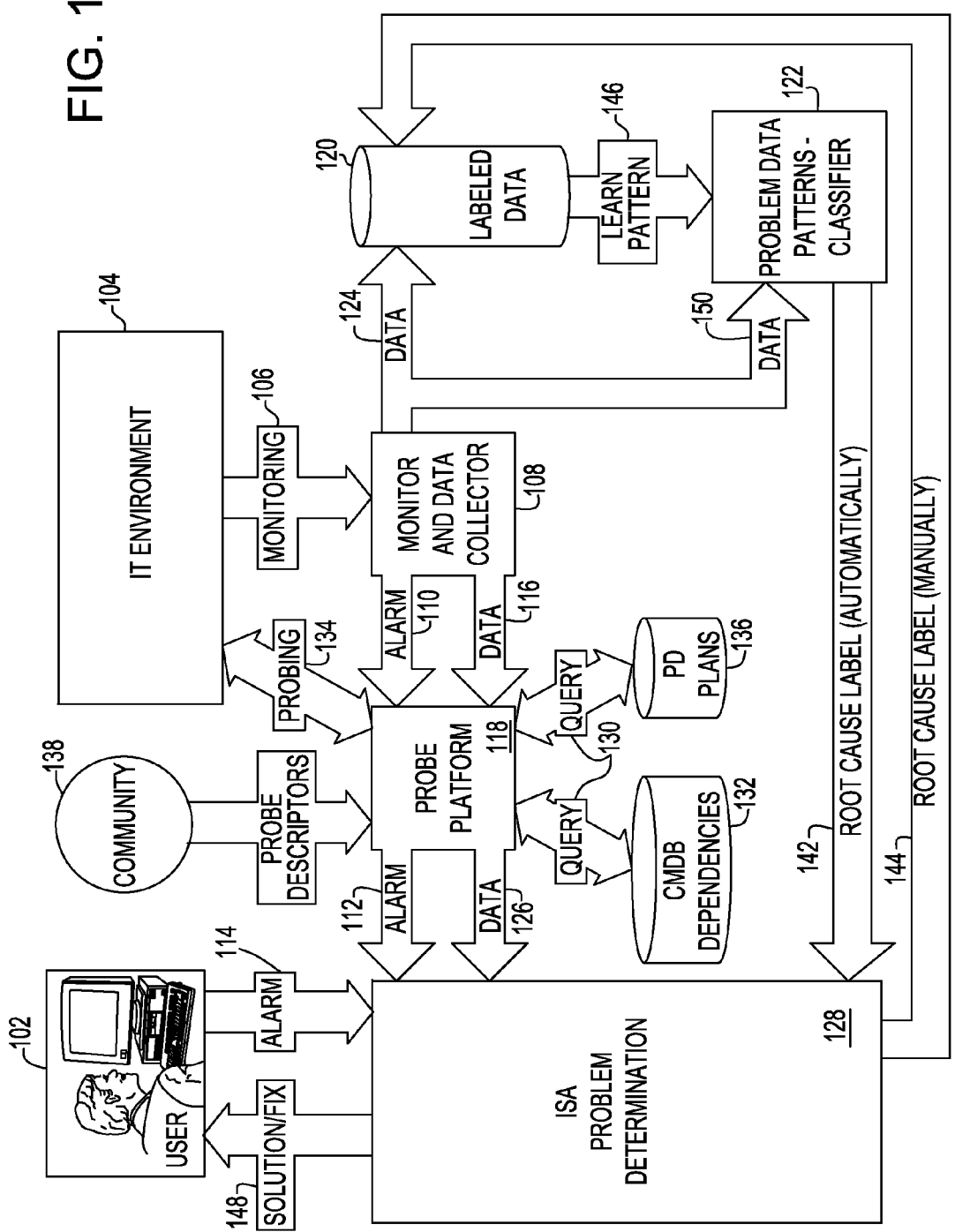
FIG. 1 illustrates a problem determination process using probe collections and problem classification for the technical support services in one embodiment of the present disclosure.

A diagram of problem determination process using probe collections and problem classification according to a method in one embodiment of the present disclosure is shown in FIG. 1. Each item and the flow of information between them during the operational phase of the system are described below.

The customer or user 102 may be experiencing a problem in their IT environment, for example an IT multi-tier distributed environment 104. An example of such a multi-tier environment is an e-business system which is supported by an infrastructure including the subsystems for example that may be connected by local and wide area networks, such as the following: web based presentation services, access services, application business logic, messaging services, database services and storage subsystems.

A monitor and data collector module 108 may monitor the customer's IT environment 104, for example, by running a process 106, and collecting periodically data such as, but not limited to, performance, resource consumption, logs data. A monitor and data collector module 108 may be a monitoring tool deployed for the customer's IT environment, for example, including monitoring server, agents, probes, data warehouses, etc. Such monitoring may employ tools such as NetSol™, ITM™, Director™.

A problem notification or an alarm 114 may originate from the user. A problem notification or an alarm 110, 112 also may be generated from the monitoring tool, for example, monitor and data collector 108. For instance, if a monitored data exceeds a predetermined criteria or threshold, the monitoring tool 108 may raise an alarm. The monitoring tool 108 also may provide data associated with monitoring shown at 116 and 124. This data may include, but is not limited to, performance data, resource utilization data, inventory, logs, traces. The type of data provided may depend on the type of monitoring tool employed in the monitoring tool 108. Data is provided for example, to End-to-end Probing Platform (EPP) also referred to as a probing plan execution platform 118, Labeled Data Repository 120 and Classifier module 122.

The monitored data 116 may be filtered, for example, by the monitor and data collector module 108, and sent to Problem Determination Module 128 as shown at 126, to Labeled Data Repository 120 shown at 124, and to Classifier module 112 as shown at 150. This data includes data filtered from the data at 116, i.e., data collected by the monitoring tool 108, by using the information on the failing resource(s) also collected at the monitoring tool 108. All the data related to well behaving resources is filtered out.

A probing plan execution platform 118 may include, for example, a workflow engine such as a Business Process Execution Language (BPEL) engine, a probe descriptor interpreter, connectors to the configuration and monitoring databases such as configuration management database (CMDB) 132, connectors to the managed systems such as ssh client, http client, java rmi client, and web services client, various types of probe launchers and result analyzers including script executer, text parsers for script output, logs, traces data, etc., and web service response analyzer. Based on the received alarm type 110 and monitoring data 116, logs, etc., the platform 118 decides on and executes the workflow in the probing plan.

Examples of probes may include Telnet and Ping. Telnetting to a database server port or invoking an operation of a Java Management Extensions (JMX) MBean of an Application Server are examples of system probes. For instance, the Telnet probe can be used to check whether a database server is running, while the JMX probe can be used to check whether the connections held by the Application Server are usable.

Low level services may be grouped in a collection of probes based on different ways of launching the probes and analyzing the outputs, such as invoking a web service, executing a database query, enabling ARM or monitoring transaction paths. For instance, the following illustrates a low level service template that executes an OS "command" and produces "textOutput" that contains the output of the command:

OSCommand Execution Service
Input—String: command
Output—String: textOutput

This service executes the command on its hosting machine in one embodiment. An advanced service for similar purpose may use host, sshUser and sshPassword as other possible inputs for executing the command remotely via ssh.

Figure 4:
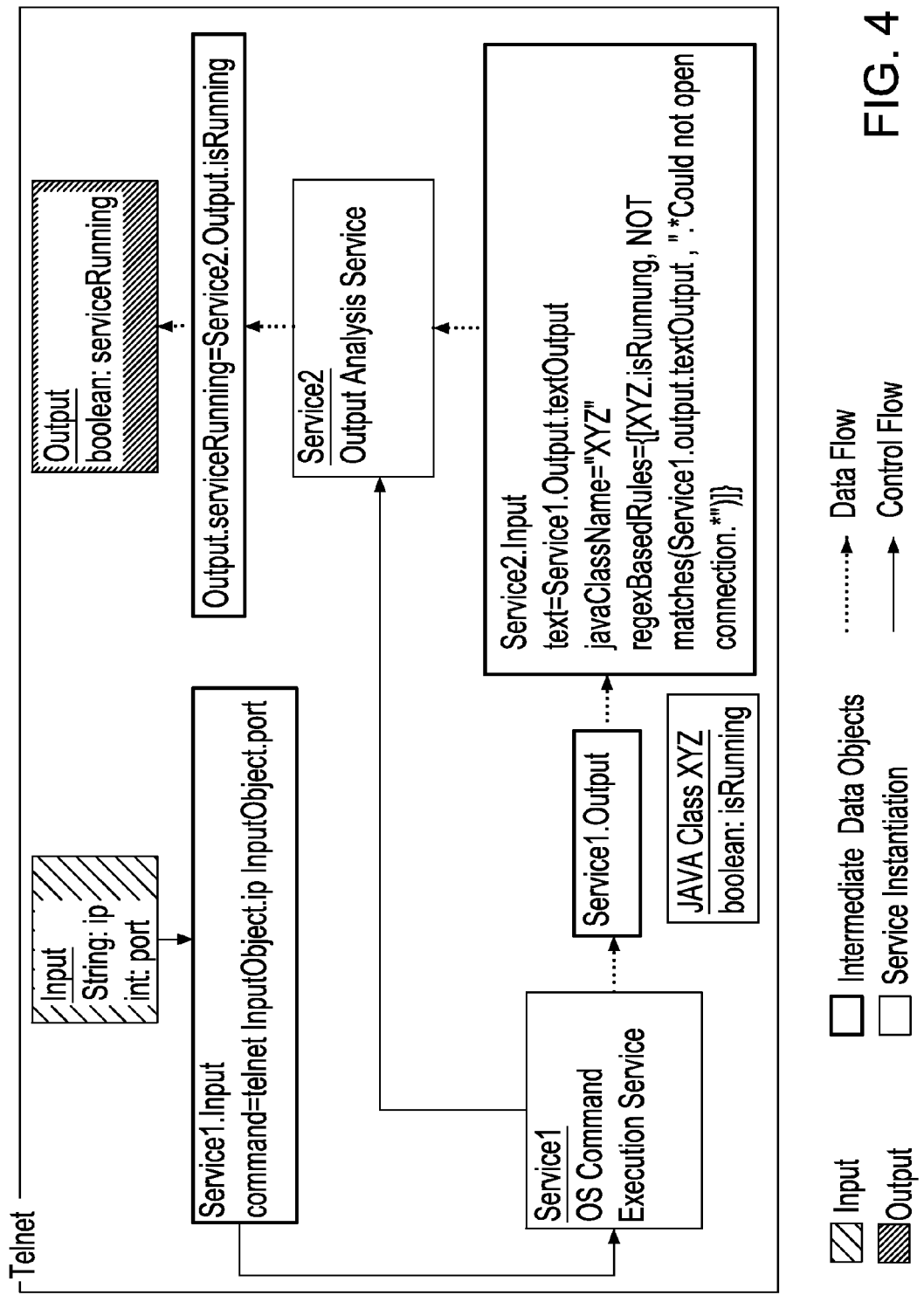
FIGS. 4-6 illustrate examples of probes of the present disclosure.

As another example the following illustrates a low level service template that creates an instance of a java class, namely javaClassName and populates its attributes using the regular expression based functions applied on text. attribute_RegEx, which contains the mapping of attribute names to such functions:

Simple Text Analysis Service
Input—String: text
   String: javaClassName
   Map: attribute_REgEX
Ouput—Object: output A simple system/network level probe template, namely Telnet, may be composed of lower level services. The probe can take two input parameters ip and port and produce a Boolean output, namely serviceRunning, that shows whether a process is listening on the given port. An example flow for such probe is shown in FIG. 4.

Figure 5:
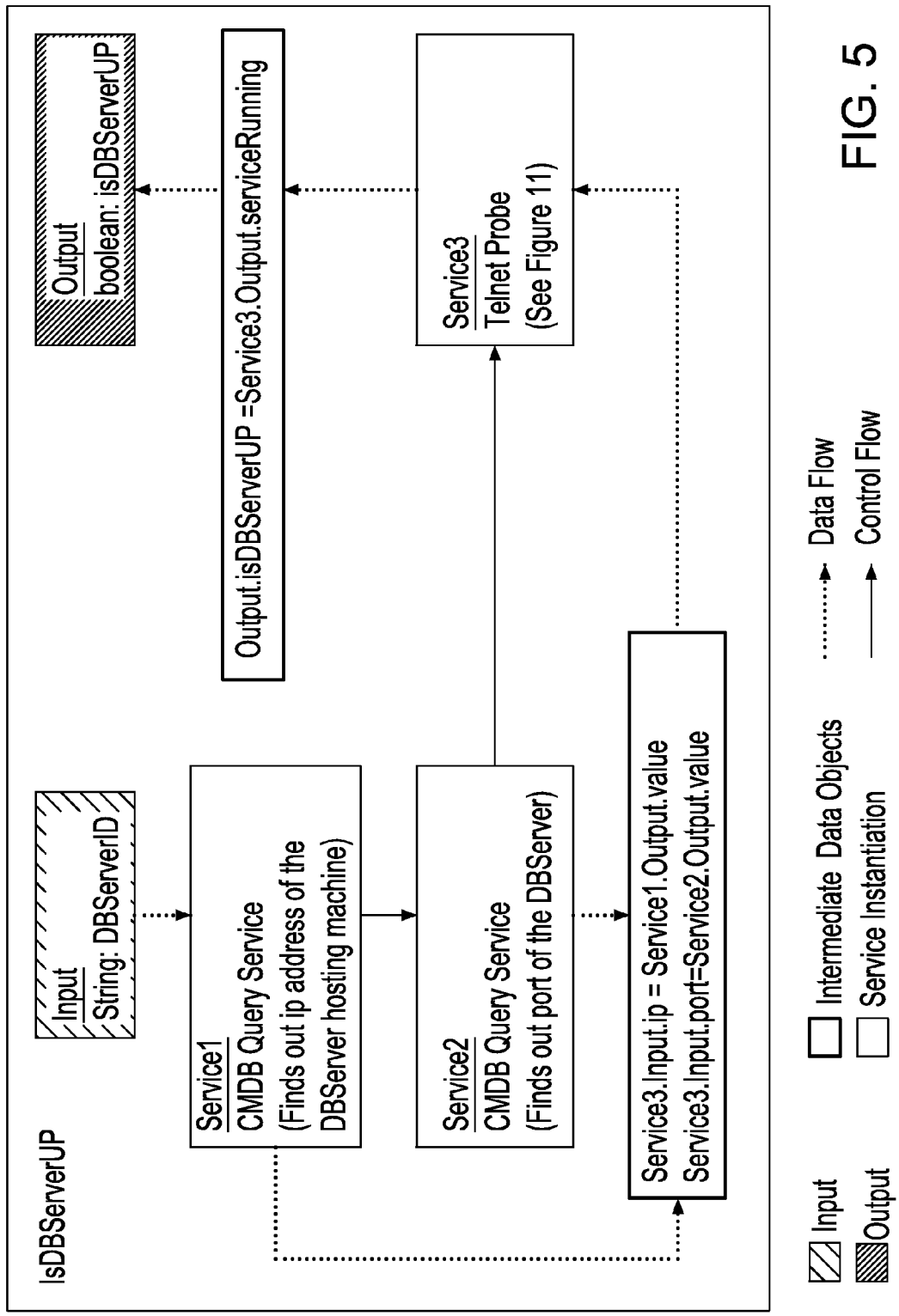

Another probe may be built that abstracts the Telnet probe at higher level for easily using it to check whether a database server is running. For example, a high level probe template namely, IsDBServerUP, may be composed of Telnet Probe and CMDB Query Service. This probe may provide a higher level of abstraction by taking DBServerID (unique ID of a DBServer in the CMDB) as input and producing boolean output namely isDBServerUP that shows whether the DBServer is running fine. FIG. 5 illustrates an example of this probe. Other advance implementations of similar service may involve more rigorous probing e.g., issuing a database query.

Figure 6:
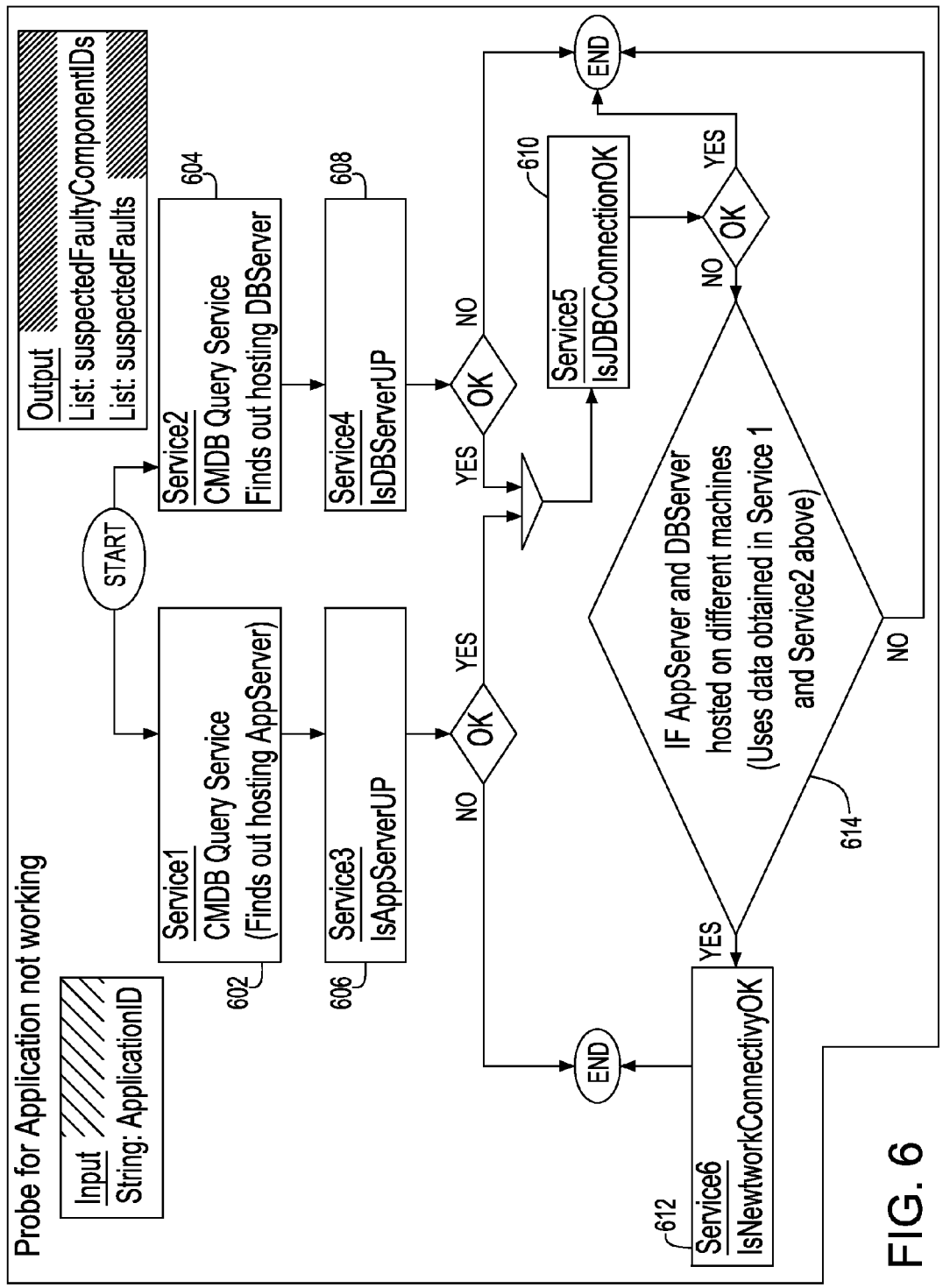

A composition of probes that includes control flow logic as well may provide the higher level probe referred to as a probing or probe plan. For instance, a simple probe template may operate at the application level and encapsulate a probing plan. A probing plan may include composite probes/services and control flow, data transformations and flow, with decision control flow. FIG. 6 illustrates an example of a probe template that operates at an application level and encapsulates a probing plan. For instance, services shown in FIG. 6, e.g., Service1, Service2, Service3, Service4, Service5, Service6 represent probes incorporated in the control flow of FIG. 6. The flow shown in FIG. 6 omits the details of data transformations and flow, for simplicity. The decision box 614 illustrates the handling of variation in the topology of the solution, based on information available in CMDB.

The low level services described above can be grouped in a collection of probes based on different ways of launching the probes and analyzing the outputs such as invoking a web service, executing a database query, enabling ARM or monitoring transaction paths. FIG. 4 illustrates a simple system/network level probe template, namely Telnet, while FIG. 5 illustrates another probe that abstracts the Telnet probe at higher level for easily using it to check whether a database server is running. When a composition of probes includes a control flow logic as well, the higher level probe is referred to as a probe plan. One such probe plan is illustrated in FIG. 6. The probe plans may be generated in that manner in the present disclosure to create repetitive problem determination processes.

In FIG. 1, the operational architecture for probes may comprise probe descriptors 140, probing 134, probe platform 118, CMDB dependencies 132, PD plans 136, Query 130. The community 138 can contribute with various low level services, simple probes, composite probes or probing plans to a shared repository called PD Plans 136. The framework of the present disclosure also may enable experts who develop various PD plans in their labs, to contribute and share the PD plans for reuse in any data center or remote management services environment (e.g., IBM Remote Infrastructure Management Services (RIMS)) without requiring any change to the PD plan template. The Probe Platform 118 may provide the run-time services for executing probe templates in a given context. In the Probe Platform 118, the PD plan 136 gets customized with the CMDB information.

During the workflow execution, when the platform 118 needs to execute a probe expressed by a generic descriptor (e.g., probe template), the platform 118 instantiates the values of the execution host and the probe parameters by querying (as shown at 130) the CMDB 132 related to that particular IT environment 104 (e.g., specified in the probe descriptor). Based on the probe results 134 received back from the IT environment 104, the probing plan execution platform 118 filters out the anomalous replies from the flawless ones and thus better localizes the failing resource(s). The data 126 related to the targeted failing resource(s) is sent to the problem classifier 150 for further analysis.

A database, a file or a collection of file 132 (e.g., CMDB) contains the information about the environment being managed. This information includes, but is not limited to, details of managed entities and structural relationships among those. Another database, a file or a collection of file 136 may store the probing algorithms and/or plans. The probing plans range from general purpose plans to services for specific plans. In one embodiment, the plans are environment independent.

The probe platform 118 gathers data by querying (130) the probe descriptor (PD) plan 136 and CMDB 132. The probe platform 118 uses the PD plan data and data from CMDB 132 to instantiates its probes.

The probing algorithms and/or plans may be developed and/or updated by a community of users. For instance, the community 138 may develop and consume various probing plans using authoring tooling shown at 140. The community 138 may be users or experts that utilize various systems and/or IT environment. The community shares in this way the experience gained across customer environments and problem resolutions, and populates at 140 the probing algorithms and/or plans repository 136.

As discussed above, authoring toolings or tools 140 may be used for the creation of probing plans. The tooling 140 may provide the environment to express the flow of a probing plan with its specific steps. These steps include but are not limited to, (i) invoking another probing plan, (ii) gathering environment configuration data from CMDB like repositories for just-in-time customization of the probing plan, as well as of related tools and scripts, (iii) data gathering from these tools and running scripts. The semantics of how to launch a probe and how to interpret its results are specified by an expert. This semantic description is referred to as a probe descriptor. Experts associate a probe descriptor with a particular resource or relationship type defined in CMDB schema. Few items in the probe descriptor are concrete, e.g., what script to execute and what parameters it has. Further, few of the description items are environment specific and hence, cannot be specified concretely in the probe descriptor. These items are specified in terms of graph paths on the CMDB object model starting from the associated model element e.g., how to derive a host machine, where to execute the script specified in the probe descriptor, how to compute the parameter values, etc.

Shown at 134 is an example of the process of probing the managed environment by Probing plan execution platform 118. A probe descriptor added by the community or expert via the tool at 140 is interpreted by the probing platform 118 and probing results are produced. Thus, the community may provide instructions by way of probe descriptor to query the environment for certain data. Under specific monitoring event types, predefined probes are applied to the environment to gather more detailed data. A particular example of probe collection is the one leading to the end-to-end transaction response time decomposition into the intervals spent at each resource involved in the transaction. This decomposition can be used to pinpoint the resource that, due to failure, has an increased response time compared to its normal behavior. Other mechanisms may be used in conjunction with the embodiments of the present invention. Based on the probe results received back from the IT environment, Probing plan execution platform 18 performs farther analysis.

A classifier module 122 receives the filtered or focused data 150 and automatically generates the root cause label 142. The classifier module 122 may be populated with patterns relevant to the problem at hand and a label is sent to Problem Determination module 128 based on the current problem monitoring data 150. The classifier module 122, for example, categorize any problem a user experiences by recognizing the problem specificity leveraging all available data such as, but not limited to, performance data, resources consumption data, logs data. As shown at 146, historical labeled monitoring data 120 is used to learn the patterns specific for an existing problem taxonomy; then problems may be recognized when given a new set of monitoring and log data based on the patterns previously learned.

The Problem Determination processes and tools 128 are used to fix the customer's incident. It may take the form of a self-assist tour (e.g., IBM Support Assistant (ISA)) or of a cycle through the technical support process. The root cause label 144 is manually given or attached to a problem by the individual who solved and closed the problem ticket opened for the customer's issue. The root cause label 144 may be stored in the labeled data repository 120. This label may be different from the type of problem initially inferred based on the problem symptoms in the Alarms 110, 112 and 114.

A database, a file or a collection of files 120 stores the monitoring data together with the corresponding label, i.e., the type of problem during which that data was generated by the monitored systems. In one embodiment, technical personnel or an operator or the like may designate a "problem label" to the monitored data manually. A learning module or process 146 learns from the labeled data 120 the patterns stored in problem data patterns-classifier 122. Any known or will be known techniques or algorithms for detecting patterns and classifying data may be used in conjunction with the embodiments of the present invention.

The following is a pseudo algorithm of the classifier 122:

```
Input M classifiers {f1(x), ..., fM(x)}, a test instance x
for each classifier fm(x) (m = 1...M)
    if fm(x) classifies x to be negative (0)
        assign ym = 0
    else if fm(x) classifies x to be positive (1)
        if yparent(m) = 1 then assign ym = 1 else assign ym = 0
end for
Output predicted class label y for x
```

The resolution 148 to the problem at hand, either found by the user or provided by the technical support service based on the data from the probe platform 118 and problem label at 142 may be also provided.

The integration of the technologies presented in FIG. 1, e.g., Problem Classification, Probes, ISA, on top of the monitoring platform, may lead to cost savings and PDR duration decrease, for example, by:

Saving labor in building and maintaining environment specific scripts/probes;

Sharing the new PD plans across environments, developed out of experiences from one account;

Providing the abstraction of probe knowledge for other people to compose higher level probes; and Empowering the service desk operators to execute relevant PD plans to gather better failure targeted monitoring data. The monitoring DATA is filtered based on the PD plans results into DATA' for ISA for further analysis before forwarding the problem tickets to technical support personnel.

Figure 2:
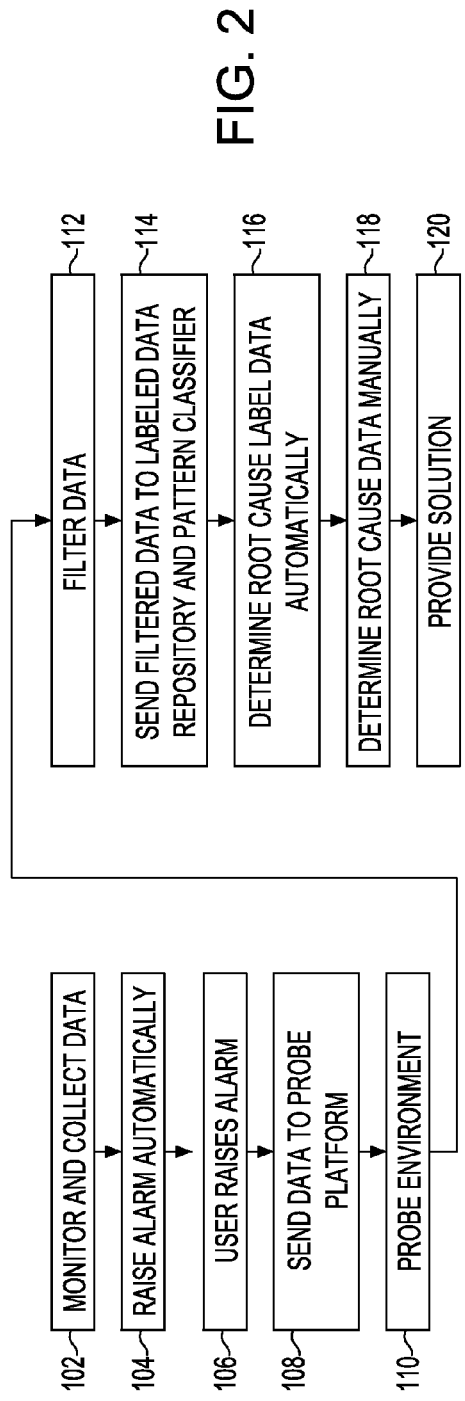
FIG. 2 is a flow diagram illustrating a method of the present disclosure in one embodiment.

FIG. 2 is a flow diagram illustrating a method of the present disclosure in one embodiment. The steps described below need not be performed in the sequential order as described below. Rather some of the steps may occur asynchronously or simultaneously with other steps. At 202, monitor and data collector module monitors and collects data from the computer system or IT environment. The data may include but is not limited to data such as performance data, resources consumption data, and log data. At 204, the monitor and data collector module may raise an alarm based on anomaly in the monitored data. In addition, at 206, a user may raise an alarm, for example, if the user using the computer system or IT environment detects a problem or error. At 208, the monitor and data collector module sends the alarm and associated data that caused the alarm to a probe platform. User raised alarm and associated data may also be sent to the probe platform For instance, a customer may call or send an email to the technical support service, which in turn may collect the necessary data and send the alarm and associated data that caused the alarm to a probe platform.

At 210, the probe platform automatically further probes the computer system or IT environment for additional information related to the problem raised as an alarm. For instance, a PD plan is used and CMDB is queried to create a customized probe for the client.

At 212, based on the probed information or results of step 210, the probe platform filters the data received from the monitor and data collector module at step 208 to focus the data to the problem. For instance, in case of problems in complex IT environment with multi-tier system dependencies, the same issue may cause various failures, and hence generate several notifications, at different levels of the multi-tier system. In such cases, the user would greatly benefit of embedded mechanisms to filter the monitoring data related to the failing resource, from all the generated data in the system. An example of such a multi-tier environment is an e-business system supported by an infrastructure that may have the following subsystems connected by local and wide area networks: web based presentation services, access services, application business logic, messaging services, database services and storage subsystems. A complex probe would generate testing probes to see what works and what does not, thus informing on what to focus the monitoring data collection.

At 214, the filtered data is sent to labeled data repository and problem data classifier. The problem data classifier matches the filtered data against the labeled patterns generated by the classification process in order to label the received monitoring data. At 216, the problem data classifier automatically determines the root cause label associated with the problem that caused the alarm to be raised at step 202.

At 218, a problem determination module may also manually determine the root cause label by using the filtered data from the probe platform. For instance, a technical support service many manually find the root cause and/or ISA may guide the problem determination process by suggesting possible tasks to perform for detecting the root cause. The determined root cause label may be stored in the labeled data repository for future references.

At 220, the solution or fix to the problem is sent to the user. For instance, once the problem is identified, known solutions may be sent to the user.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
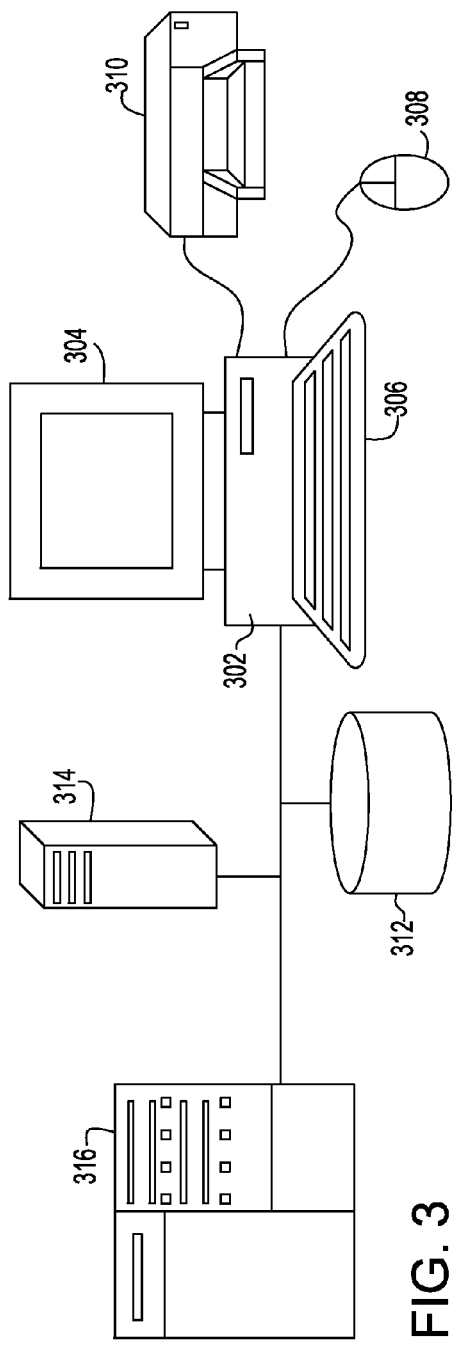
FIG. 3 illustrates an example a computer system which may carry out or execute the systems and methodologies of the present disclosure in one embodiment.

Referring now to FIG. 3, the systems and methodologies of the present disclosure may be carried out or executed in a computer system that includes a processing unit 302, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 302 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 318), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for problem determination using probe collections and problem classification for technical support services, comprising:
    monitoring and collecting, by a processor, data associated with a running computer system;
    raising an alarm, automatically by the processor, based on the monitored and collected data;
    probing the computer system for additional information associated with the alarm based on a probe plan including composite probes and control flow, data transformations and flow with decision control flow, stored in a shared repository, the shared repository being updatable by a community of probe developers wherein the community is enabled to provide instructions for querying the computer system by way of one or more probes stored in the shared repository;
    filtering the monitored and collected data based on the additional information established from probing, the filtering including filtering out one or more replies from one or more components of the computer system running flawlessly and localizing one or more failing resources; and
    using the filtered data to label a problem associated with the raised alarm.

2. The method of claim 1, wherein the step of using the filtered data includes matching the filtered data against labeled patterns.

3. The method of claim 2, wherein the labeled patterns are generated using a classification process.

4. The method of claim 1, wherein the step of probing includes automatically executing a probe of said one or more probes.

5. The method of claim 4, further including using a probe descriptor and data associated with the computer system to instantiate the probe of said one or more probes, wherein the probe descriptor includes a generic descriptor and the data associated with the computer system is obtained by querying a configuration management database storing information related to a plurality of IT environments, wherein the data associated with the computer system is used as one or more probe parameters.

6. The method of claim 1, further including manually raising an alarm.

7. A non-transitory program storage device readable by a machine, tangibly embodying a program of instructions executable by the machine to perform a method for problem determination using probe collections and problem classification for technical support services, comprising:
    monitoring and collecting, by a processor, data associated with a running computer system;
    raising an alarm, automatically by the processor, based on the monitored and collected data;
    probing the computer system for additional information associated with the alarm based on a probe plan including composite probes and control flow, data transformations and flow with decision control flow, stored in a shared repository, the shared repository being updatable by a community of probe developers wherein the community is enabled to provide instructions for querying the computer system by way of one or more probes stored in the shared repository;
    filtering the monitored and collected data based on the additional information established from probing, the filtering including filtering out one or more replies from one or more components of the computer system running flawlessly and localizing one or more failing resources; and
    using the filtered data to label a problem associated with the raised alarm.

8. The program storage device of claim 7, wherein the step of using the filtered data includes matching the filtered data against labeled patterns.

9. The program storage device of claim 8, wherein the labeled patterns are generated using a classification process.

10. The program storage device of claim 7, wherein the step of probing includes automatically executing a probe of said one or more probes.

11. The program storage device of claim 10, further including using a probe descriptor and data associated with the computer system to instantiate the probe of said one or more probes, wherein the probe descriptor includes a generic descriptor and the data associated with the computer system is obtained by querying a configuration management database storing information related to a plurality of IT environments, wherein the data associated with the computer system is used as one or more probe parameters.

12. The program storage device of claim 7, further including manually raising an alarm.

13. A system for problem determination using probe collections and problem classification for technical support services, comprising:

a processor;

a monitoring and data collection processing module operable to monitor and collect data associated with a computer system, the monitoring and data collection module further operable to raise an alarm based on the monitored and collected data;

a probe platform operable to execute on the processor and further operable to probe the computer system for additional information based on a probe plan including composite probes and control flow, data transformations and flow with decision control flow, stored in a shared repository, the shared repository being updatable by a community of probe developers wherein the community is enabled to provide instructions for querying the computer system by way of one or more probes stored in the shared repository, the probe platform further operable to filter the monitored and collected data based on the additional information established from probing, the filtering including filtering out one or more replies from one or more components of the computer system running flawlessly and localizing one or more failing resources; and a classifier module operable to use the filtered data and automatically label a problem associated with the raised alarm.

14. The system of claim 13, wherein the computer system includes a computer system infrastructure having a plurality of subsystems connected by local and wide area networks.

15. The system of claim 13, wherein the classifier module is operable to match the filtered data against labeled patterns.

16. The system of claim 15, wherein the classifier module is operable to generate the labeled patterns using a classification process.

17. The system of claim 13, wherein the probe platform is operable to automatically execute a probe of said one or more probes.

18. The system of claim 17, further including a probe descriptor plan database storing a plurality of probe descriptors.

19. The system claim 18, further including configuration management database storing data associated with the computer system.

20. The system of claim 19, wherein the probe platform is operable to instantiate the probe of said one or more probes using one of more of the probe descriptors and the configuration management database data, wherein the probe descriptor includes a generic descriptor and the data associated with the computer system is obtained by querying the configuration management database storing information related to a plurality of IT environments, wherein the data associated with the computer system is used as one or more probe parameters to the generic descriptor.

* * * * *